US012803006B2

(12) United States Patent
Wang et al.

(10) Patent No.: US 12,803,006 B2
(45) Date of Patent: Nov. 17, 2026

(54) CARBON SUPPORT, CATALYST FOR FUEL CELLS, CATALYST LAYER FOR FUEL CELLS, AND METHOD FOR PRODUCING THE CARBON SUPPORT

(71) Applicants: Yunan Wang, Toyota (JP); Rui Imoto, Toyota (JP); Kumiko Nomura, Toyota (JP); Naoki Hasegawa, Nagakute (JP); Tomohiro Takeshita, Nagakute (JP); Kazuhisa Yano, Nagakute (JP); Hironobu Nanbu, Yokkaichi (JP); Yuuki Kasama, Yokkaichi (JP); Keisuke Asakura, Kakegawa (JP); Takanobu Kuroki, Kakegawa (JP); Hitohiko Sato, Kakegawa (JP); Tsubasa Yoneuchi, Kakegawa (JP); Akihiro Hori, Kakegawa (JP)

(72) Inventors: Yunan Wang, Machida (JP); Rui Imoto, Fujisawa (JP); Kumiko Nomura, Okazaki (JP); Naoki Hasegawa, Nagakute (JP); Tomohiro Takeshita, Nagakute (JP); Kazuhisa Yano, Nagakute (JP); Hironobu Nanbu, Suzuka (JP); Yuuki Kasama, Yokkaichi (JP); Keisuke Asakura, Hamamatsu (JP); Takanobu Kuroki, Hamamatsu (JP); Hitohiko Sato, Hamamatsu (JP); Tsubasa Yoneuchi, Hamamatsu (JP); Akihiro Hori, Fukuroi (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 692 days.

(21) Appl. No.: 18/303,619

(22) Filed: Apr. 20, 2023

(65) Prior Publication Data

US 2023/0343971 A1 Oct. 26, 2023

(30) Foreign Application Priority Data

Apr. 25, 2022 (JP) ................................ 2022-071227

(51) Int. Cl.
*H01M 4/90* (2006.01)

(52) U.S. Cl.
CPC ................................ *H01M 4/9083* (2013.01)

(58) Field of Classification Search
CPC ....... B01J 21/18; C01B 32/05; C01P 2004/04; H01M 4/9083
See application file for complete search history.

(56) References Cited

U.S. PATENT DOCUMENTS 6,812,187 B1 11/2004 Pak et al.
2011/0223494 A1 * 9/2011 Feaver .................. H01M 4/382 429/525

(Continued)

FOREIGN PATENT DOCUMENTS

CN 1521877 A 8/2004
CN 116960372 A * 10/2023 ............. B01J 21/18

(Continued)

OTHER PUBLICATIONS

Yarlagadda et al., Ordered mesoporous carbon supported fuel cell cathode catalyst for improved oxygen transport, Journal of Power Sources, vol. 532, Jun. 1, 2022, 231349.*

(Continued)

*Primary Examiner* — Jun L
(74) *Attorney, Agent, or Firm* — Dickinson Wright, PLLC

(57) ABSTRACT

To provide a carbon support for catalysts for fuel cells, which increases the power generation performance of fuel cells, a catalyst for fuel cells, a catalyst layer for fuel cells, and a method for producing the carbon support. A carbon support for catalysts for fuel cells, wherein the carbon support includes at least one pore; wherein a thickness of a (Continued)

carbon wall of the carbon support, which is derived from a three-dimensional pore structure of a silica mold obtained by pore volume measurement of the silica mold by nitrogen adsorption analysis, is 3.3 nm or more and 11.2 nm or less; and wherein a carbon wall content is more than 60.3 ml/g and less than 190.8 ml/g.

5 Claims, 2 Drawing Sheets

(56) References Cited

U.S. PATENT DOCUMENTS

| | | | | |
|---|---|---|---|---|
| 2020/0287221 | A1* | 9/2020 | Iijima | H01M 4/8817 |
| 2020/0295354 | A1* | 9/2020 | Lee | H01M 4/38 |
| 2021/0163292 | A1 | 6/2021 | Hasegawa et al. | |

FOREIGN PATENT DOCUMENTS

| | | | |
|---|---|---|---|
| JP | 2007220414 | A | 8/2007 |
| JP | 2010265125 | A | 11/2010 |
| JP | 2019169317 | A | 10/2019 |
| JP | 2021084852 | A | 6/2021 |

OTHER PUBLICATIONS

Li et al., Pore-throat structure characterization of carbon fiber reinforced resin matrix composites: Employing Micro-CT and Avizo technique, PLoS ONE 16(9): e0257640. https://doi.org/10.1371/journal.pone.0257640.*

Guo Rong et al., "Enhanced electrochemical performance of mesoporous carbon with increased pore size and decreased pore wall thickness", Electrochimia Acta, Elsevier, Amsterdam, NL, vol. 174, Jun. 29, 2015. P1050-1056.

* cited by examiner (X, Y, Z) = (39, 39, 39) nm (X, Y, Z) = (39, 39, 39) nm

CARBON SUPPORT, CATALYST FOR FUEL CELLS, CATALYST LAYER FOR FUEL CELLS, AND METHOD FOR PRODUCING THE CARBON SUPPORT

TECHNICAL FIELD

The disclosure relates to a carbon support, a catalyst for fuel cells, a catalyst layer for fuel cells, and a method for producing the carbon support.

BACKGROUND

Various studies have been made on fuel cells.

For example, Patent Literature 1 discloses mesoporous carbon that has a low filling property and can be produced at low cost, a method for producing the same, and a solid polymer fuel cell using the same.

Patent Literature 2 discloses a monodispersed spherical carbon porous body which has a diameter, a pore size and a specific surface area within a specific range and which is suitable for a catalyst carrier of an air electrode-side catalyst layer of a solid polymer fuel cell, and a solid polymer fuel cell in which the monodispersed spherical carbon porous body is used.

Patent Literature 3 discloses spherical mesoporous carbon having a center pore diameter of more than 2 nm and a method for producing the carbon.

Patent Literature 4 discloses a catalyst layer with high water retention and capable of obtaining high battery performance even under low-humidity environment, and a polymer electrolyte fuel cell using the catalyst layer.

Patent Literature 1: Japanese Patent Application Laid-Open (JP-A) No. 2021-084852

Patent Literature 2: JP-A No. 2019-169317

Patent Literature 3: JP-A No. 2010-265125

Patent Literature 4: JP-A No. 2007-220414.

To achieve high power generation performance (efficiency point performance) in a low current density range, a carbon support needs to have a three-dimensional pore structure.

In the prior art, the average primary particle diameter, average pore diameter, pore volume of carbon are defined. However, definitions of the carbon wall content by nitrogen adsorption, the carbon support ratio by 3D-TEM, the average diameter of the throats of the pore, and the like are not done, and the power generation performance of fuel cells is sometimes insufficient in the prior art.

SUMMARY

The disclosure was achieved in light of the above circumstances. An object of the disclosure is to provide a carbon support for catalysts for fuel cells, which increases the power generation performance of fuel cells, a catalyst for fuel cells, a catalyst layer for fuel cells, and a method for producing the carbon support.

The carbon support of the present disclosure is a carbon support for catalysts for fuel cells, wherein the carbon support includes at least one pore;

wherein a thickness of a carbon wall of the carbon support, which is derived from a three-dimensional pore structure of a silica mold obtained by pore volume measurement of the silica mold by nitrogen adsorption analysis, is 3.3 nm or more and 11.2 nm or less; and wherein a carbon wall content is more than 60.3 ml/g and less than 190.8 ml/g.

In the carbon support of the present disclosure, a carbon support ratio calculated by 3D-TEM observation may be more than 36% and less than 67%.

The carbon support may include at least one throat in the pore, and an average diameter of the at least one throat of the pore, which is calculated by 3D-TEM observation, may be 1.9 nm or more and less than 2.5 nm.

The carbon wall content may be 61.5 ml/g or more and 168.4 ml/g or less; the carbon support ratio may be 46% or more and 57% or less; and the average diameter of the at least one throat of the pore may be 1.9 nm or more and 2.0 nm or less.

The catalyst for fuel cells according to the present invention, is a catalyst for fuel cells, wherein the catalyst comprises a carbon support supporting a metal catalyst, and wherein the carbon support is the above-described carbon support.

The catalyst layer for fuel cells according to the present invention, is a catalyst layer for fuel cells, wherein the catalyst layer comprises the above-described catalyst for fuel cells.

The carbon support production method of the present invention is a method for producing the above-described carbon support, wherein a silica including at least one pore is produced as a mold.

According to the disclosure, the power generation performance of fuel cells is increased.

BRIEF DESCRIPTION OF THE DRAWINGS

In the accompanying drawings.

DETAILED DESCRIPTION

Figure 1A:
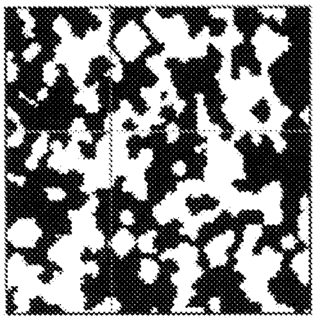
FIG. 1A shows a planar TEM image of the carbon support of Example 1.

Hereinafter, the embodiments of the present disclosure will be described in detail. Matters that are required to implement the present disclosure (such as common carbon support structures and production processes not characterizing the present disclosure) other than those specifically referred to in the Specification, may be understood as design matters for a person skilled in the art based on conventional techniques in the art. The present disclosure can be implemented based on the contents disclosed in the Specification and common technical knowledge in the art.

In FIGS. 1A, 1B, 2A and 2B, parameters relating to size (such as length, width and thickness) are not parameters reflecting the actual size.

In the Specification, "-" used to indicate a numerical range, is used to mean that the range includes the numerical values described before and after "-" as the lower and the upper limit values.

Also in the Specification, the upper and lower limit values of the numerical range may be a desired combination.

1. Carbon Support

The carbon support of the present disclosure is a carbon support for catalysts for fuel cells, wherein the carbon support includes at least one pore;

wherein a thickness of a carbon wall of the carbon support, which is derived from a three-dimensional pore structure of a silica mold obtained by pore volume measurement of the silica mold by nitrogen adsorption analysis, is 3.3 nm or more and 11.2 nm or less; and wherein a carbon wall content is more than 60.3 ml/g and less than 190.8 ml/g.

According to the disclosure, by using the silica having the three-dimensional pore structure as the mold, the carbon support having the controlled carbon wall thickness and the controlled carbon wall content, is obtained.

The carbon support of the disclosure has the three-dimensional pore structure which includes the carbon wall having a thickness in the predetermined range and which contains the predetermined amount of the carbon wall. Accordingly, the metal catalyst can be uniformly supported in the pore of the carbon support. The power generation performance of fuel cells is increased by using, as the catalyst for fuel cells, the carbon support uniformly supporting the metal catalyst. Especially, the efficiency point performance (the power generation performance in the low current density range) is increased thereby.

The carbon support of the disclosure includes the at least one pore and may be a porous carbon support.

The pore may be a mesopore. The carbon support may be mesoporous carbon.

The average pore diameter of the mesopore may be from 2 nm to 50 nm. The average pore diameter is obtained by randomly selecting several pores, measuring the diameters of the pores, and calculating the average of the pore diameters. The average pore diameter can be measured by 3D-TEM (transmission electron microscopy) or the like.

In the carbon support of the present disclosure, the thickness of the carbon wall of the carbon support, which is derived from the three-dimensional pore structure of the silica mold obtained by pore volume measurement of the silica mold by nitrogen adsorption analysis, is 3.3 nm or more and 11.2 nm or less. From the viewpoint of further increasing the power generation performance of fuel cells, the carbon wall content may be more than 60.3 ml/g and less than 190.8 ml/g.

The carbon support of the present disclosure is obtained as follows: using the silica having the three-dimensional pore structure as the mold, a carbon source is introduced into the pore of the silica to obtain a silica-carbon composite; the carbon source in the silica-carbon composite is carbonized; and the silica is removed from the silica-carbon composite, thereby obtaining the carbon support. As a result, the silica structure is transferred to the carbon support of the present disclosure.

Accordingly, the thickness of the carbon wall of the carbon support can be derived by measuring the pore diameter of the three-dimensional pore structure of the silica mold obtained by pore volume measurement of the silica mold by nitrogen adsorption analysis. The thickness of the carbon wall can be derived by randomly selecting several pores of the three-dimensional pore structure of the silica mold, measuring the diameters of the pores, and calculating the average of the pore diameters.

In the present disclosure, the carbon wall is used for the same meaning as a so-called pore wall, and the carbon wall means a carbon pore wall.

The carbon wall content can be derived by measuring the pore volume of the three-dimensional pore structure of the silica mold obtained by pore volume measurement of the silica mold by nitrogen adsorption analysis. For example, the volume of the pore of the three-dimensional pore structure of the silica mold can be obtained from a difference between the adsorption amount when the nitrogen adsorption relative pressure of the pore of the silica is 0.8 and the adsorption amount when the nitrogen adsorption relative pressure is 0.4.

In the present disclosure, the carbon wall content means the volume (ml/g) of the carbon wall per gram of the carbon support.

In the carbon support of the present disclosure, the carbon support ratio calculated by 3D-TEM observation may be more than 36% and less than 67%. From the viewpoint of further increasing the power generation performance of fuel cells, the carbon support ratio may be 46% or more and 57% or less.

In the present disclosure, the carbon support ratio means the proportion of the region which is occupied by the carbon when the region which is occupied by the entire carbon support is defined as 100%. The region other than the region occupied by the carbon, is occupied by a void space.

For example, the void ratio of the carbon support may be from 33% to 64%.

The carbon support may include at least one throat in the pore.

The diameter of the at least one throat is smaller than the pore diameter.

In the carbon support of the present disclosure, the average diameter of the at least one throat of the pore, which is calculated by 3D-TEM observation, may be 1.9 nm or more and less than 2.5 nm. From the viewpoint of further increasing the power generation performance of fuel cells, the average diameter may be 1.9 nm or more and 2.0 nm or less. The average diameter of the at least one throat is the average of the diameters of randomly selected throats.

The carbon support may be in a particulate form, that is, it may be carbon support particles.

The particle diameter of the carbon support particles is not particularly limited, as long as it is larger than the pore diameter. For example, it may be 4 nm or more and 100 nm or less.

The particle diameter of the carbon support particles may be measured by 3D-TEM or the like.

2. Method for Producing the Carbon Support

In the method for producing the carbon support according to the present disclosure, the silica including the at least one pore is produced as the mold.

The method for producing the carbon support according to the present disclosure may include (1) preparing the silica including the at least one pore as the mold, (2) obtaining the silica-carbon composite by depositing the carbon in the pore of the silica, and (3) obtaining the carbon support by removing the silica from the silica-carbon composite.

(1) Preparing the Silica

The prepared silica includes the at least one pore and has the three-dimensional pore structure. The silica may be porous silica, or it may be mesoporous silica.

The three-dimensional pore structure may be a beaded structure (random structure) described below or the like.

As the silica, commercially-available silica or synthesized silica may be used.

The method for producing the silica generally includes the following steps: a polymerization step in which precursor particles are obtained by, in a reaction solution containing a silica source, a surfactant and a catalyst, subjecting the silica source to condensation polymerization; a drying step in which the precursor particles are separated from the reaction solution and the separated precursor particles are dried; and a sintering step in which the silica particles each including at least one pore, are obtained by sintering the dried precursor particles. In the silica production, by limiting the concentrations of the surfactant and silica source of the reaction solution to specific ranges, such mesoporous silica is obtained, that it has a beaded structure and its pore diameter, pore volume and the like are within specific ranges. By using the mesoporous silica having the beaded structure as the mold, mesoporous carbon having a beaded structure is obtained. The "beaded structure" means a structure such that primary particles are connected like beads on a string. Each of the primary particles of the beaded structure includes a pore. In the beaded structure, the primary particles including the pore are connected. Accordingly, a long pore may be formed by the connected pores of the primary particles. In general, the form of the primary particles is not perfectly spherical, and it is an irregular form having an aspect ratio of about 1.1 to 3. In the long pore of the beaded structure, one or more throats having a smaller diameter than the pore diameter, may be formed.

(1-1) Polymerization Step

First, in the reaction solution containing the silica source, the surfactant and the catalyst, the silica source is subjected to condensation polymerization, thereby obtaining the precursor particles.

The type of the silica source is not particularly limited. As the silica source, examples include, but are not limited to, the following:

(a) tetraalkoxysilanes such as tetramethoxysilane, tetraethoxysilane, tetraisopropoxysilane, tetrabutoxysilane, dimethoxydiethoxysilane and tetraethyleneglycoxysilane, and (b) trialkoxysilanes such as 3-mercaptopropyltrimethoxysilane, 3-aminopropyltrimethoxysilane, aminopropyltriethoxysilane and 3-(2-aminoethyl)aminopropyltrimethoxysilane.

As the silica source, any one of the above examples may be used, or two or more of the above examples may be used in combination.

When the concentration of the silica source is too low, the deposition speed of the precursor particles slows, and the structure composed of the connected primary particles is not obtained. Accordingly, the concentration of the silica source may be 0.05 mol/L or more.

On the other hand, when the concentration of the silica source is too high, the deposition speed of the precursor particles becomes too fast, and the diameter of the primary particles easily exceeds 300 nm. Accordingly, the concentration of the silica source may be 1.0 mol/L or less.

In the case of subjecting the silica source to condensation polymerization in the reaction solution, by adding the surfactant to the reaction solution, the surfactant forms a micelle in the reaction solution. Since hydrophilic groups surround the micelle, the silica source adsorbs onto the surface of the micelle. In addition, the micelle to which the silica source adsorbs, causes self-assembly in the reaction solution, thereby causing condensation polymerization of the silica source. As a result, a pore attributed to the micelle is formed inside the primary particles. The size of the pore can be controlled to, for example, 1 nm to 50 nm, primarily by the molecular length of the surfactant.

As the surfactant, examples include, but are not limited to, hexadecyltrimethylammonium halide, octadecyltrimethylammonium halide, nonyltrimethylammonium halide, decyltrimethylammonium halide, undecyltrimethylammonium halide and dodecyltrimethylammonium halide.

In the case of synthesizing the silica including the at least one pore, one kind of surfactant may be used, or two or more kinds of surfactants may be used. Since the surfactant functions as a template for the formation of the pore in the primary particles, the type of the surfactant has a large influence on the size of the pore. From the viewpoint of synthesizing silica particles having a more uniform pore, one kind of surfactant may be used.

When the concentration of the surfactant is too low, the deposition speed of the primary particles slows, and the structure composed of the connected primary particles is not obtained. Accordingly, the concentration of the surfactant may be 0.03 mol/L or more.

On the other hand, when the concentration of the surfactant is too high, the deposition speed of the primary particles becomes too fast, and the diameter of the primary particles easily exceeds 300 nm. Accordingly, the concentration of the surfactant may be 1.0 mol/L or less.

In the case of subjecting the silica source to condensation polymerization, generally, the catalyst is added to the reaction solution. As the catalyst, examples include, but are not limited to, sodium hydroxide and alkali such as ammonia water.

The concentration of the catalyst is not particularly limited. In general, when the concentration of the catalyst is low, the deposition speed of the precursor particles slows. On the other hand, when the concentration of the catalyst is too high, the deposition speed of the precursor particles becomes fast. The optimal catalyst concentration may be selected depending on the type of the silica source, the type of the surfactant, and target physical property values, for example.

As a solvent, water, an organic solvent, a mixed solvent of water and an organic solvent, or the like is used.

As the organic solvent, examples include, but are not limited to, monovalent alcohol such as methanol, ethanol and propanol, divalent alcohol such as ethylene glycol, and trivalent alcohol such as glycerol.

In the case of using the mixed solvent of water and the organic solvent, the amount of the organic solvent in the mixed solvent can be selected depending on an intended purpose. In general, by adding an appropriate amount of the organic solvent to water, the particle diameter, particle size distribution and the like of the silica particles can be easily controlled.

The silica source is added to the solvent containing the predetermined amount of the surfactant. Then, the silica source is subjected to hydrolysis and polycondensation. Accordingly, the surfactant functions as the template, and the precursor particles containing the silica and the surfactant are obtained.

As the reaction condition, an optimal condition is selected depending on the type of the silica source, the particle diameter of the precursor particles, and so on. In general, the reaction temperature may be from −20° C. to 100° C.

(1-2) Drying Step

Next, the precursor particles are separated from the reaction solution and dried.

The precursor particles are dried for the removal of the solvent remaining in the particles. The drying condition is not particularly limited, as long as the solvent removal is possible.

(1-3) Diameter Expansion Step

Next, as needed, the dried precursor particles may be subjected to diameter expansion. The diameter expansion means expanding the diameter of the pores of the primary particles.

More specifically, the diameter expansion is carried out by hydrothermal treatment of the synthesized precursor particles (not yet subjected to the removal of the surfactant) in a solution containing a diameter expanding agent. By the diameter expansion, the pore diameter of the precursor particles is expanded.

As the diameter expanding agent, examples include, but are not limited to, (a) hydrocarbon such as trimethylbenzene, triethylbenzene, benzene, cyclohexane, triisopropylbenzene, naphthalene, hexane, heptane, octane, nonane, decane, undecane and dodecane, and (b) acid such as hydrochloric acid, sulfuric acid and nitric acid.

The expansion of the pore diameter by the hydrothermal treatment in the coexistence of the hydrocarbon, is thought to be because rearrangement of the silica occurs when the diameter expanding agent is introduced from the solvent into the pores of the precursor particles having higher hydrophobicity.

The expansion of the pore diameter by the hydrothermal treatment in the coexistence of the acid such as hydrochloric acid, is thought to be because dissolution and redeposition of the silica proceed inside the primary particles. By optimizing the production condition, the pores are radially formed inside the silica. By subjecting the radial pores to the hydrothermal treatment in the coexistence of the acid, dissolution and redeposition of the silica occur, and the radial pores are changed into a long pore.

The condition of the diameter expansion is not particularly limited, as long as the target pore diameter is obtained. In general, with respect to the reaction solution, 0.05 mol/L to 10 mol/L of the diameter expanding agent is added, and the hydrothermal treatment is done at a temperature of from 60° C. to 150° C. By controlling the hydrothermal temperature, the pore diameter thus obtained may be controlled.

(1-4) Sintering Step

Next, the precursor particles are sintered after the diameter expansion step is carried out as needed. Accordingly, the silica particles each including the at least one pore are obtained.

The precursor particles are sintered for the purpose of dehydrating and crystallizing the precursor particles in each of which an OH group remains, and for the purpose of thermal decomposition of the surfactant remaining in the pores. The sintering condition is not particularly limited, as long as the dehydration, the crystallization and the thermal decomposition of the surfactant are done. In general, the precursor particles are sintered at a temperature of from 400° C. to 700° C. for one to 10 hours in the air.

(2) Step of Obtaining the Silica-Carbon Composite

The method for obtaining the silica-carbon composite by depositing carbon in the pore of the silica, is not particularly limited, and a conventionally-known method may be appropriately employed.

More specifically, carbon is deposited in the pore by introducing a carbon precursor in the pore and polymerizing and carbonizing the carbon precursor in the pore.

The carbon precursor means a precursor that can produce carbon by thermal decomposition. As the carbon precursor, examples include, but are not limited to, the following: a thermally-polymerizable polymer precursor that is liquid at ordinary temperatures (such as furfuryl alcohol and aniline); a mixture of an acid and an aqueous solution of a carbohydrate (e.g., a mixture of an acid such as sulfuric acid, hydrochloric acid, nitric acid and phosphoric acid and a carbohydrate such as a monosaccharide (e.g., sucrose, xylose and glucose), a disaccharide and a polysaccharide; and a mixture of two-component curable polymer precursors (e.g., phenol and formalin).

In the case of using a liquid carbon precursor or a carbon precursor solution, the liquid or solution amount per use may be large, and it may be such an amount, that the whole pore is filled with the liquid or solution.

In the case of using the mixture of the acid and the aqueous solution of the carbohydrate as the carbon precursor, the acid amount may be the minimum amount with which organic substances are polymerizable.

In the case of using the mixture of the two-component curable polymer precursors as the carbon precursor, the most appropriate ratio is selected depending on the type of the polymer precursors.

Next, the polymerized carbon precursor is carbonized in the pore.

The carbon precursor is carbonized by heating the silica containing the carbon precursor at a predetermined temperature in an unoxidized atmosphere (such as an inert atmosphere and in vacuum). More specifically, the heating temperature may be 500° C. or more and 1200° C. or less. When the heating temperature is less than 500° C., the carbon precursor is insufficiently carbonized. On the other hand, when the heating temperature is more than 1200° C., the silica reacts with the carbon. The heating time is appropriately selected depending on the heating temperature.

(3) Silica Removal Step

Next, the silica serving as the mold is removed from the silica-carbon composite. Accordingly, the carbon support includes the pore is obtained.

The method for removing the silica from the silica-carbon composite is not particularly limited, and a conventionally-known method may be appropriately employed. As the method for removing the silica from the silica-carbon composite, examples include, but are not limited to, a method in which the silica is dissolved by heating the silica-carbon composite in an alkaline aqueous solution such as sodium hydroxide, and the dissolved silica is removed, and a method in which the silica of the silica-carbon composite is etched away in a hydrofluoric acid aqueous solution.

(4) Graphitization Step

Next, as needed, the carbon support is subjected to thermal treatment at a temperature higher than 1500° C. In the case of carbonizing the carbon source in the pore of the silica, the thermal treatment temperature needs to be low to suppress a rection between the silica and the carbon. Accordingly, the graphitization degree of the carbonized carbon support is low. To obtain a high graphitization degree, the carbon support is subjected to thermal treatment at high temperature after the removal of the mold.

When the thermal treatment temperature is too low, the graphitization is poor. Accordingly, the thermal treatment temperature may be more than 1500° C.

On the other hand, when the thermal treatment temperature is higher than necessary, there is no difference in effects, and there is no benefit. Accordingly, the thermal treatment temperature may be 2300° C. or less.

3. Catalyst for Fuel Cells

The catalyst for fuel cells according to the present disclosure is a catalyst for fuel cells, wherein the catalyst comprises a carbon support supporting a metal catalyst, and wherein the carbon support is the above-described carbon support.

The metal catalyst is supported on the carbon support of the present disclosure.

As the metal catalyst, examples include, but are not limited to, platinum and a platinum alloy. The platinum alloy may be an alloy of platinum and one or more kinds of metals selected from the group consisting of cobalt, nickel, iron, manganese, copper, titanium, tungsten, tin, gallium, zirconium, chromium, gadolinium, terbium, ytterbium, hafnium and osmium. Of them, the metal catalyst may be platinum, a platinum-cobalt alloy, a platinum-nickel alloy or the like. Especially, the metal catalyst may be a platinum-cobalt alloy.

The metal catalyst may be in a particulate form, that is, it may be metal catalyst particles.

The particle diameter of the metal catalyst particles is not particularly limited. It may be 1 nm or more and 10 nm or less. The particle diameter of the metal catalyst particles may be measured by 3D-TEM or the like.

When the particle diameter of the metal catalyst particles is equal to or more than the pore diameter of the carbon support, the metal catalyst particles may be supported on the outer circumferential surface of the carbon support.

When the particle diameter of the metal catalyst particles is equal to or more than the average diameter of the at least one throat in the pore of the carbon support and is less than the pore diameter of the carbon support, the metal catalyst particles may be supported on a nearer-side region than the at least one throat in the pore of the carbon support.

When the particle diameter of the metal catalyst particles is less than the average diameter of the at least one throat in the pore of the carbon support, the metal catalyst particles may be supported on a deeper-side region than the at least one throat in the pore of the carbon support.

4. Catalyst Layer for Fuel Cells

The catalyst layer for fuel cells according to the present disclosure contains the above-described catalyst for fuel cells. In general, it further contains an electrolyte.

The electrolyte may be a proton conductive electrolyte, or it may be a fluorine-based resin or the like. As the fluorine-based resin, for example, a perfluorosulfonic acid-based resin such as NAFION (trade name) may be used.

The catalyst layer of the present disclosure is a layer for fuel cells.

The fuel cell of the present disclosure includes the catalyst layer of the present disclosure.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer. As needed, it includes the cathode-side gas diffusion layer.

The anode (fuel electrode) includes the anode catalyst layer. As needed, it includes the anode-side gas diffusion layer.

The catalyst layer for fuel cells according to the present disclosure may be used as the cathode catalyst layer, as the anode catalyst layer, or as both the cathode catalyst layer and the anode catalyst layer.

The cathode catalyst layer and the anode catalyst layer are collectively referred to as "catalyst layer".

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a NAFION membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing a reaction gas, a refrigerant or the like to flow in the stacking direction of the unit fuel cells. As the refrigerant, for example, a mixed solution of ethylene glycol and water may be used to prevent freezing at low temperature.

In the present disclosure, the fuel gas and the oxidant gas are collectively referred to as "reaction gas". The reaction gas supplied to the anode is fuel gas, and the reaction gas supplied to the cathode is oxidant gas. The fuel gas is a gas mainly containing hydrogen, and it may be hydrogen. The oxidant gas may be oxygen, air, dry air or the like.

The separator may include a reaction gas flow path on a surface in contact with the gas diffusion layer. Also, the separator may include a refrigerant flow path for keeping the temperature of the fuel cell constant, on the surface opposite to the surface in contact with the gas diffusion layer.

The separator may be a gas-impermeable electroconductive member or the like. As the electroconductive member, examples include, but are not limited to, gas-impermeable dense carbon obtained by compressing carbon, and a metal plate (such as an iron plate, an aluminum plate and a stainless-steel plate) obtained by press-molding. The separator may function as a collector.

EXAMPLES

Hereinafter, the present disclosure will be described in more detail with reference to examples and comparative examples. The technical scope of the present disclosure is not limited to these examples. The examples and comparative examples are not distinguished based on whether or not they are included in the scope of the claims. Embodiments that obtained excellent results are regarded as examples, and other embodiments are regarded as comparative examples.

Example 1

A mesoporous silica was prepared. Using the mesoporous silica as a mold, a carbon support was produced.

The mesoporous silica used as the mold was such a mesoporous silica, that the thickness of the carbon wall of the carbon support thus obtained was 3.3 nm or more and 11.2 nm or less, and the carbon wall content was 168.4 ml/g. The pore volume of the three-dimensional pore structure of the silica was calculated from a difference between the adsorption amount when the nitrogen adsorption relative pressure of the pore of the silica was 0.8 and the adsorption amount when the nitrogen adsorption relative pressure was 0.4. The carbon wall content of the carbon support was derived from the calculated pore volume.

Example 2

The carbon support of Example 2 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 166.6 ml/g.

Example 3

The carbon support of Example 3 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 61.5 ml/g.

Comparative Example 1

The carbon support of Comparative Example 1 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 42.5 ml/g.

Comparative Example 2

The carbon support of Comparative Example 2 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 40.6 ml/g.

Comparative Example 3

The carbon support of Comparative Example 3 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 190.8 ml/g.

Comparative Example 4

The carbon support of Comparative Example 4 was obtained in the same manner as Example 1, except for the following: such a mesoporous silica was used as the mold, that the thickness of the carbon wall of the carbon support thus obtained was 3.3 nm or more and 11.2 nm or less, and the carbon wall content was 60.3 ml/g.

[3D-TEM Observation]

The carbon supports of Examples 1 to 3 and Comparative Examples 1 to 4 were observed by 3D-TEM to measure the carbon support ratio (%) of the carbon support and the average diameter (nm) of throats in the pore of the carbon support. The measurement results are shown in Table 1.

Figure 1B:
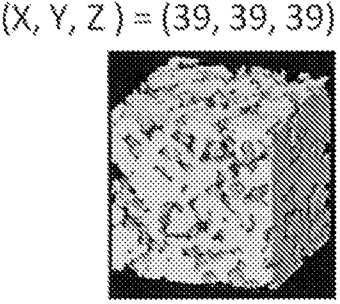
FIG. 1B shows a three-dimensional reconstructed image of FIG. 1A.
Figure 2A:
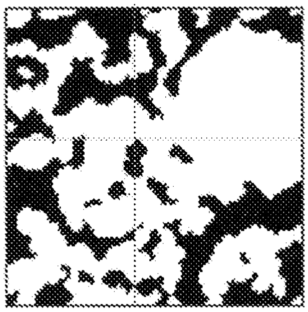
FIG. 2A shows a planar TEM image of the carbon support of Comparative Example 1.
Figure 2B:
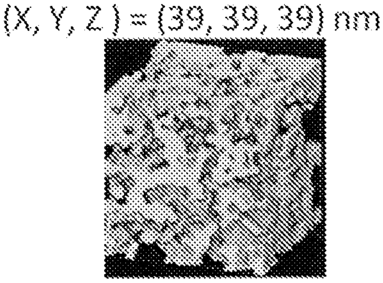
FIG. 2B shows a three-dimensional reconstructed image of FIG. 2A.

FIG. 1A shows a planar TEM image of the carbon support of Example 1;

FIG. 1B shows a three-dimensional reconstructed image of FIG. 1A;

FIG. 2A shows a planar TEM image of the carbon support of Comparative Example 1; and FIG. 2B shows a three-dimensional reconstructed image of FIG. 2A.

As shown in FIGS. 1A and 1B and Table 1, as for the carbon support of Example 1, the carbon wall content is suitable; the carbon support ratio is suitable; and the average diameter of the throats in the pore of the carbon support, is suitable.

As shown in FIGS. 2A and 2B and Table 1, as for the carbon support of Comparative Example 1, the carbon wall content is small; the carbon support ratio is low; and the average diameter of the throats in the pore of the carbon support, is too large.

[Production of Catalysts for Fuel Cells]

As a metal catalyst, a platinum-cobalt alloy was loaded on the carbon support of Example 1, thereby obtaining a platinum-cobalt-alloy-supporting carbon support as a catalyst for fuel cells (hereinafter, it may be simply referred to as "fuel cell catalyst"). In the same manner as Example 1, the platinum-cobalt-alloy-supporting carbon supports of Example 2 and 3 and Comparative Examples 1 to 4 were obtained.

[Mass Activity of the Fuel Cell Catalysts]

As for each of the fuel cell catalysts of Examples 1 to 3 and Comparative Examples 1 to 4, the mass activity (A/g-Pt) per gram of platinum was evaluated by the rotating disk electrode (RDE) method.

More specifically, a catalyst ink was produced by dissolving the fuel cell catalyst in a mixed solvent containing ultrapure water, alcohol and NAFION (trade name). The catalyst ink was applied onto a glassy carbon (GC) electrode, and the applied catalyst ink was dried, thereby obtaining an evaluation electrode. In the RDE method, a three-electrode cell was used; a 0.1 M perchloric acid aqueous solution was used as an electrolytic solution; a reversible hydrogen electrode (RHE) was used as a reference electrode; and a Pt black mesh was used as a counter electrode. The oxygen reduction reaction (ORR) mass activity (MA) of the fuel cell catalyst was obtained from linear sweep voltammogram (LSV) measurement results. The measurement results are shown in Table 1.

<Production of Unit Fuel Cells>

The fuel cell catalyst of Example 1 was dispersed in an organic solvent. A dispersion thus obtained was applied to a TEFLON (trade name) sheet to form an electrode. A total of two electrodes were formed, and an electrolyte membrane was sandwiched by the two electrodes. They were attached by hot pressing to obtain a membrane electrode assembly. The membrane electrode assembly was sandwiched by two diffusion layers to obtain the unit fuel cell of Example 1. Using the fuel cell catalysts of Examples 2 and 3 and Comparative Examples 1 to 4, the unit fuel cells of Examples 2 and 3 and Comparative Examples 1 to 4 were obtained in the same manner as Example 1.

<Evaluation of Efficiency Point Performance>

The temperature of each of the unit fuel cells of Examples 1 to 3 and Comparative Examples 1 to 4 was set to 80° C., and the relative humidity of the two electrodes of each unit fuel cell was set to 85%. IV measurement of each unit fuel cell was carried out by use of a small unit fuel cell evaluation system (manufactured by Toyo Corporation).

In the IV measurement, current was controlled in a range of from 0.01 A/cm$^2$ to 4.0 A/cm$^2$. The voltage value at 0.2 A/cm$^2$ was measured and defined as efficiency point voltage. The measurement results are shown in Table 1.

TABLE 1

| | Carbon wall thickness (nm) | Carbon wall content (ml/g) | Carbon support ratio (%) | Average diameter (nm) of throats | MA (A/g-Pt) | Efficiency point voltage (V) |
|---|---|---|---|---|---|---|
| Example 1 | 3.3-11.2 | 168.4 | 57 | 1.9 | 497.9 | 0.892 |
| Example 2 | 3.3-11.2 | 166.6 | 47 | 1.9 | 510.7 | 0.889 |
| Example 3 | 3.3-11.2 | 61.5 | 46 | 2.0 | 462.7 | 0.884 |
| Comparative Example 1 | 3.3-11.2 | 42.5 | 36 | 2.5 | 373.5 | 0.882 |
| Comparative Example 2 | 3.3-11.2 | 40.6 | 54 | 2.1 | 336.5 | 0.873 |
| Comparative Example 3 | 3.3-11.2 | 190.8 | 61 | 1.8 | 314.7 | 0.880 |
| Comparative Example 4 | 3.3-11.2 | 60.3 | 67 | 2.1 | 314.3 | 0.880 |

The mass activity is higher in the fuel cell catalysts using the carbon supports of Examples 1 to 3 than in the fuel cell catalysts using the carbon supports of Comparative Examples 1 to 4.

The efficiency point voltage is higher in the unit fuel cells using the fuel cell catalysts using the carbon supports of Examples 1 to 3, than in the unit fuel cells using the fuel cell catalysts using the carbon supports of Comparative Examples 1 to 4.

The reason is as follows: the metal catalyst is uniformly supported by the use of the carbon supports of Examples 1 to 3, and the power generation performance, especially the efficiently the efficiency point performance, is increased, accordingly.

The invention claimed is:

1. A carbon support for catalysts for fuel cells, wherein the carbon support includes at least one pore;

wherein a thickness of a carbon wall of the carbon support, is 3.3 nm or more and 11.2 nm or less;

wherein the carbon support includes at least one throat in the at least one pore, the at least one throat having a smaller diameter than a diameter of the at least one pore, and an average diameter of the at least one throat of the at least one pore is 1.9 nm or more and less than 2.5 nm; and wherein a carbon wall content is more than 60.3 ml/g and less than 190.8 ml/g.

2. The carbon support according to claim 1, wherein a carbon support ratio calculated by three-dimensional transmission electron microscopy (3D-TEM) observation is more than 36% and less than 67%.

3. The carbon support according to claim 1, wherein the carbon wall content is 61.5 ml/g or more and 168.4 ml/g or less;

wherein the carbon support ratio is 46% or more and 57% or less; and wherein the average diameter of the at least one throat of the at least one pore is 1.9 nm or more and 2.0 nm or less.

4. A catalyst for fuel cells, wherein the catalyst comprises a carbon support supporting a metal catalyst, and wherein the carbon support is the carbon support defined by claim 1.

5. A catalyst layer for fuel cells, wherein the catalyst layer comprises the catalyst for fuel cells defined by claim 4.

* * * * *